United States Patent [19]
Kitabayashi et al.

[11] Patent Number: 5,920,858
[45] Date of Patent: Jul. 6, 1999

[54] PERSONAL INFORMATION MANAGING DEVICE CAPABLE OF SYSTEMATICALLY MANAGING OBJECT DATA OF MORE THAN ONE KIND USING A SINGLE DATABASE

[75] Inventors: Shinichi Kitabayashi, Kashihara; Makoto Nakamura, Amagasaki, both of Japan

[73] Assignee: Sharp Kabushiki Kaisha, Osaka, Japan

[21] Appl. No.: 08/754,820

[22] Filed: Nov. 21, 1996

[30] Foreign Application Priority Data

Nov. 24, 1995 [JP] Japan .................................. 7-306219

[51] Int. Cl.$^6$ .................................................. G06F 12/00
[52] U.S. Cl. ..................... 707/4; 707/2; 707/3; 707/200; 707/523; 705/8
[58] Field of Search ............................... 707/4, 200, 523, 707/2, 3; 705/8

[56] References Cited

U.S. PATENT DOCUMENTS

| | | | |
|---|---|---|---|
| 5,179,502 | 1/1993 | Matsuda | 361/680 |
| 5,392,447 | 2/1995 | Schlack et al. | 345/339 |
| 5,408,599 | 4/1995 | Nomura et al. | 395/147 |
| 5,465,352 | 11/1995 | Nakazawa et al. | 707/3 |
| 5,483,052 | 1/1996 | Smith, III et al. | 235/472 |
| 5,499,109 | 3/1996 | Mathur et al. | 358/400 |
| 5,606,712 | 2/1997 | Hidaka | 395/800.01 |
| 5,696,496 | 12/1997 | Kumar | 340/825.25 |
| 5,715,446 | 2/1998 | Kinoshita et al. | 707/5 |

*Primary Examiner*—Paul V. Kulik
*Assistant Examiner*—Jean R. Homere
*Attorney, Agent, or Firm*—Nixon & Vanderhye P.C.

[57] ABSTRACT

An information managing device capable of systematically managing object data of more than one kind using a single database, having an object managing unit for storing the object data of more than one kind in general format, and a filter managing unit for storing a filter which specifies a specific format for each kind of object data. When the object data are registered, a control unit converts the object data the user has inputted in its specific format into those in general format to store the converted object data into the object managing unit. On the other hand, when the object data are retrieved, the control unit converts the object data in general format into those in specific format using the filter of the same kind as the desired object data.

13 Claims, 18 Drawing Sheets

FIG. 3 (a)
INDIVIDUAL FILTER

| NAME | ADDRESS | ZIP CODE | TEL. | OFFICE | ... |

FIG. 3 (b)
COMPANY FILTER

| COMPANY NAME | ADDRESS | ZIP CODE | TEL. | RESPONSIBLE PERSON | ... |

FIG. 3 (c)
DOCUMENT FILTER

| DOCUMENT TITLE | STORAGE | REMARKS | ... |

FIG. 3 (d)
MEETING ROOM FILTER

| ROOM No. | LOCATION | EXTENSION | ... |

F I G. 4

| FILTER No. | FILTER TITLE | DATA LENGTH | HEAD POINTER |
|---|---|---|---|
| 1 | INDIVIDUAL | 1000 | 8000 |
| 2 | COMPANY | 1500 | 9000 |
| 3 | DOCUMENT | 500 | 10500 |
| 4 | MEETING ROOM | 700 | 11000 |
| ⋮ | ⋮ | ⋮ | ⋮ |

FIG. 5 (a)

| FILTER FLAG | INDIVIDUAL |
|---|---|
| IDENTITY | TARO YAMADA |
| LOCATION | KASUGA-CHO, NARA-CITY, NARA |
| ATTRIBUTE 1 | 630 |
| ATTRIBUTE 2 | 0742-99-9999 |
| ⋮ | ⋮ |

FIG. 5 (b)

| NAME | |
|---|---|
| ADDRESS | |
| ZIP CODE | |
| TEL. | |
| ⋮ | ⋮ |

FIG. 5 (c)

| NAME | TARO YAMADA |
|---|---|
| ADDRESS | KASUGA-CHO, NARA-CITY, NARA |
| ZIP CODE | 630 |
| TEL. | 0742-99-9999 |
| ⋮ | ⋮ |

FIG. 8 (a)

| FILTER FLAG | INDIVIDUAL |
| NAME | ICHIRO YAMADA |
| ADDRESS | 1-1, MINAMI-WARD, OSAKA-CITY |
| ZIP CODE | 530 |
| TEL. | 06-123-4567 |
| OFFICE | TANAKA CO., LTD. |
| ⋮ | ⋮ |

FIG. 8 (b)

| FILTER FLAG | COMPANY |
| COMPANY NAME | ICHIRO YAMADA |
| ADDRESS | 1-1, MINAMI-WARD, OSAKA-CITY |
| ZIP CODE | 530 |
| TEL. | 06-123-4567 |
| RESPONSIBLE PERSON | TANAKA CO., LTD. |
| ⋮ | ⋮ |

FIG. 8 (c)

| FILTER FLAG | COMPANY |
| COMPANY NAME | TANAKA CO., LTD. |
| ADDRESS | 1-1, MINAMI-WARD, OSAKA-CITY |
| ZIP CODE | 530 |
| TEL. | 06-123-4567 |
| RESPONSIBLE PERSON | ICHIRO YAMADA |
| ⋮ | ⋮ |

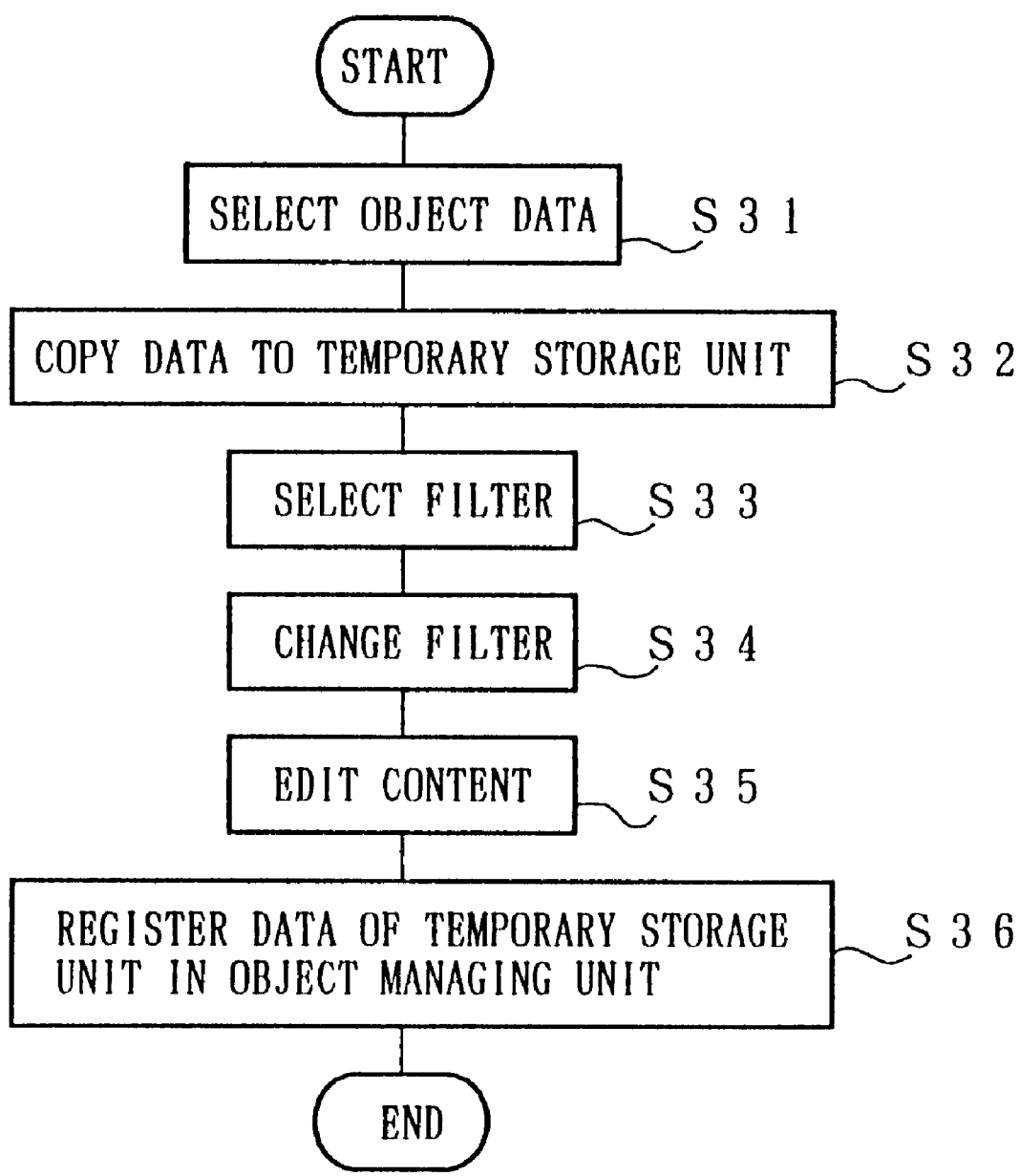

FIG. 10 (a)

| DATA ID No. | 10 |
|---|---|
| ACTION | PRODUCTS PLANNING |

FIG. 10 (b)

| DATA ID No. | 11 |
|---|---|
| ACTION | BUSINESS TRIP TO TOKYO BRANCH |

FIG. 10 (c)

| DATA ID No. | 12 |
|---|---|
| ACTION | LIAISON CONFERENCE |

| START TIME | END TIME | LINK DATA | |
|---|---|---|---|
| 343434 | 565656 | 23 | 45  51 |
| 787878 | 912345 | 44 | 45  67  97 |
| ⋮ | ⋮ | ⋮ | ⋮ |

ACTION DATA    OBJECT DATA

| DATA ID No. | POINTER IN TABLE |
|---|---|
| 1 | 0 |
| 2 | 250 |
| 3 | 400 |
| ⋮ | ⋮ |

FIG. 16

| TIME | 13:00-15:00, MAY 1ST |
| --- | --- |
| ACTION | SALES PROMOTION MEETING |
| MEETING ROOM | ROOM No. 5 |
| INDIVIDUAL | YAMAMOTO, TANAKA, SUZUKI |
| DOCUMENT | DRAFT PRODUCTS STANDARD |

PERSONAL INFORMATION MANAGING DEVICE CAPABLE OF SYSTEMATICALLY MANAGING OBJECT DATA OF MORE THAN ONE KIND USING A SINGLE DATABASE

FIELD OF THE INVENTION

The present invention relates to a personal information managing device, such as an electronic pocketbook.

BACKGROUND OF THE INVENTION

A personal information managing device of a portable size and weight that stores databases for managing the user's schedule, address book, etc. has been widely used, and a good example of which is an electronic pocketbook. The personal information managing device of this type has been commercialized in various models, and the most advanced ones are furnished with diversified functions including a managing function of an address book, a company list, name cards, and a personal schedule, a document preparing function, etc.

The above conventional models generally include separate databases for each kind of object to be managed (hereinafter, referred to simply as object). For example, when the object is individuals, an address book database having columns of name, address, zip code, telephone number, office, etc. is used, and when the object is companies, a database having columns of company name, business address, zip code, telephone number, facsimile number, responsible person, etc. is used.

However, the above-arranged models have a number of problems. To begin with, the user has to manage objects of different kinds using their respective database managing software programs. For example, even when a home address and a business address are identical, the user has to input the data into the databases of both kinds, thereby making the data input a time-consuming job. Also, the user has to switch the databases if the information he wishes to retrieve belongs to an object of different kind from the one currently used, thereby complicating the process of information retrieval.

In addition, if the user wishes to manage an item, such as a regular meeting, despite the fact that the content of data, that is, the title of the meeting, meeting room, and participants, is more or less the same, the user has to input all the data from the beginning for every single meeting, thereby making the data input as a time and effort demanding job. Further, storing the data redundantly is not preferable for a portable information managing device with a limited storage capacity. Furthermore, when the user wishes to amend the data, he has to do so repetitively if the concerned data are registered in more than one database. This makes the data amendment troublesome; moreover, the user may miss some of these databases and leaves the data unamended in the objects of the corresponding kinds.

Besides the aforementioned problems, the typical model is arranged to manage the schedule per day or per month, and therefore, the typical model can not manage a scheduled item if it extends into the next day or beyond. Thus, if the user wishes to input such a more-than-one-day schedule, he has to input the data in every single day during the period the scheduled item is expected to extend, which is also a time and effort demanding job.

SUMMARY OF THE INVENTION

It is therefore an object of the present invention to provide an information managing device which can systematically manage objects of more than one kind, such as "individual", "company", and "document", to save time and effort of the user when he registers or retrieves data.

The above object is fulfilled by an information managing device furnished with:

an object managing unit for storing object data of more than one kind in general format;

a filter managing unit for storing a filter which defines a specific format for the objects of each kind;

a data management control unit for converting the object data in specific format into the object data in general format to store the converted object data into the object managing unit, and for retrieving the object data from the object managing unit to convert the retrieved object data into the object data in specific format for a kind of an object of said retrieved object data, wherein the respective object data are correlated with filter identifiers which respectively specifies their own filters of same kinds.

According to the above arrangement, the object data of different kinds, that is, data describing information of different kinds of objects, such as "individual" and "company", are stored as a whole in general format in the object managing unit regardless of their kinds. Note that respective object data are correlated with the filter identifiers which respectively specifies their own filters of the same kinds. Thus, when the user wishes to retrieve the object data, the data managing control unit retrieves the filter having the same kind as the desired object data from the filter managing unit based on the correlated filter identifier, and converts the above object data in general format to those in a specific format of that particular kind to display the converted object data.

When the user wishes to register new object data, the data managing unit converts the object data in specific format of their own kind into those in general format to store the converted object data into the object managing unit, while at the same time, the data managing unit correlates the converted object data with a filter identifier of the filter defining the kind of the new object data.

According to the above arrangement, it has become possible to manage information related to the objects of more than one kind systematically. Thus, when the user wishes to register or retrieve information, he does not have to switch the databases according to the kinds of the objects, thereby enabling high-speed processing of the information of various kinds. Consequently, the above arrangement makes the information managing device of the present information easy to manipulate.

According to the above arrangement, it has also become possible to search the objects of different kinds in a single operation. Assume that the user wishes to list up the addresses to mail out New Year's greeting cards. If the objects of different kinds, namely, the "individual" and "company" herein, are managed by their respective databases as are in the conventional information managing device, the user has to search the names and addresses from the "individual" database, and switches to the "company" database to search the company names and addresses again, which is time-wasting. According to the arrangement of the present invention, however, the object data of more than one kind are systematically managed in one data format by a single database. Therefore, the above arrangement makes the information managing device of the present invention advantageous in that it can extract the object data of different kinds simultaneously only by giving an adequate searching condition.

Preferably, the information managing device of the present invention may be arranged to be further furnished with:

an input unit for inputting a time zone;

an action managing unit for storing action data;

a schedule managing unit for storing the input time zone in relation with at least an action data identifier which specifies action data related to the input time zone, wherein, when there exist any object data accompanying with the input time zone, the schedule managing unit also stores an object data identifier which specifies the object data accompanying with the input time zone.

According to the above arrangement, the time zone the user has inputted through the input unit are stored in the schedule managing unit in relation with the action data describing the action detail scheduled within the above time zone, together with the object data accompanying with the above time zone if any of such object data exist. Note that the action detail and object data per se are not written into the schedule managing unit, but they are stored in the schedule managing unit in the form of identifiers that identify the action data describing the action detail and the above accompanying object data, respectively.

Thus, when the user wishes to input the detail of a meeting scheduled at a specific time zone, the user prepares the action data describing "meeting" as the action detail in the action managing unit, and the object data describing information as to the participants (for example, names, addresses, departments, etc.) and the place of the meeting (for example, room No., extension, etc.) in the object managing unit. Then, the identifiers of the above-prepared action data and above-prepared object data are stored in the schedule managing unit in relation with the above time zone, respectively.

Suppose another meeting will be held with the same participants. Then, since the information as to the participants have been already stored in the object managing unit as the object data, the user only has to update a time zone of the above meeting and correlate the time zone and the object data. In short, according to the above arrangement, the user does not have to input information redundantly. Thus, the above arrangement makes the information managing device of the present invention advantageous in that not only the user's time and effort can be saved, but also the input information can be effectively utilized. Further, the information managing device of the present invention is also arranged not to store information redundantly, which makes the information managing device of the present invention advantageous in that its storage capacity is utilized to its full, and the user can amend the information in a reliable manner by so doing only once.

The above object is also fulfilled by a method of scheduling an action with an information managing device for managing object data of more than one kind including action data, having the steps of:

(a) displaying at least a time axis extending more than one day to input a time zone;

(b) inputting action data related to the time zone;

(c) storing the time zone in relation with the input action data; and (d) when there exist any input object data accompanying with the time zone, correlating the input object data with the time zone in addition to the input action data.

According to the above arrangement, the user can input an arbitrary time zone with respect to the time axis extending more than one day. Thus, the user can input a scheduled item that extends into the next day or beyond or the next month or beyond. Thus, the information managing device of the present invention can manage an item scheduled within an arbitrary time zone.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) through 3(d) are conceptional views explaining example filters defining specific formats of the object data of four example kinds, respectively;

FIG. 4 is a view explaining an example content of a filter information managing table of the above electronic pocketbook;

FIG. 5(a) is a view explaining example object data in general format;

FIG. 5(b) is a view explaining an example "individual filter" as one of the defined filters;

FIG. 5(c) is a view explaining how the object data in general format of FIG. 5(a) are converted into those in specific format through the "individual filter" of FIG. 5(b);

FIGS. 8(a) through 8(c) illustrate an example screen of a display unit when new object data are created by copying the object data of one kind as those of another kind, and FIG. 8(a) is a view explaining the screen displaying individual data used as original data subject to copying, FIG. 8(b) is a view explaining the screen displaying the above individual data immediately after the same were copied as the company data, and FIG. 8(c) is a view explaining the screen displaying the copied data after the same are edited;

FIG. 9 is a flowchart detailing the procedure of creating new object data by copying the object data of one kind as those of another kind;

FIGS. 10(a) through 10(c) are views explaining respective example action data which are stored in an action data section of the above electronic pocketbook;

FIG. 11(a) is a view explaining example schedule data which are stored in a schedule data section of the above electronic pocketbook;

FIG. 11(b) is a view explaining an example content of a schedule information managing table;

FIG. 16 is a view explaining example schedule data retrieved and displayed in accordance with the flowchart of FIG. 15;

DESCRIPTION OF THE EMBODIMENTS

Figure 1:
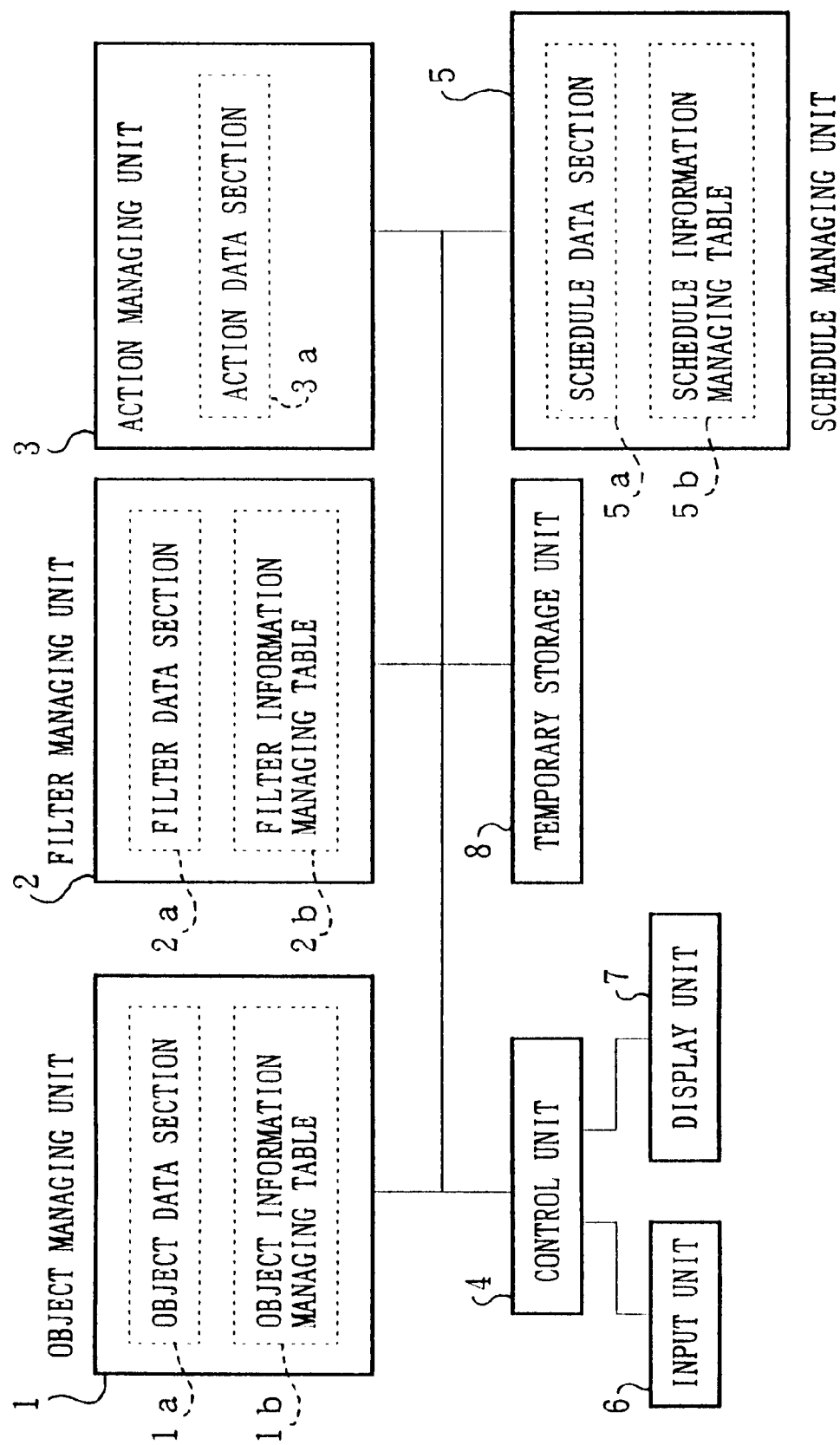
FIG. 1 is a block diagram depicting a structure of a control system in an electronic pocketbook adopted as an example embodiment of the present invention.
Figure 2:
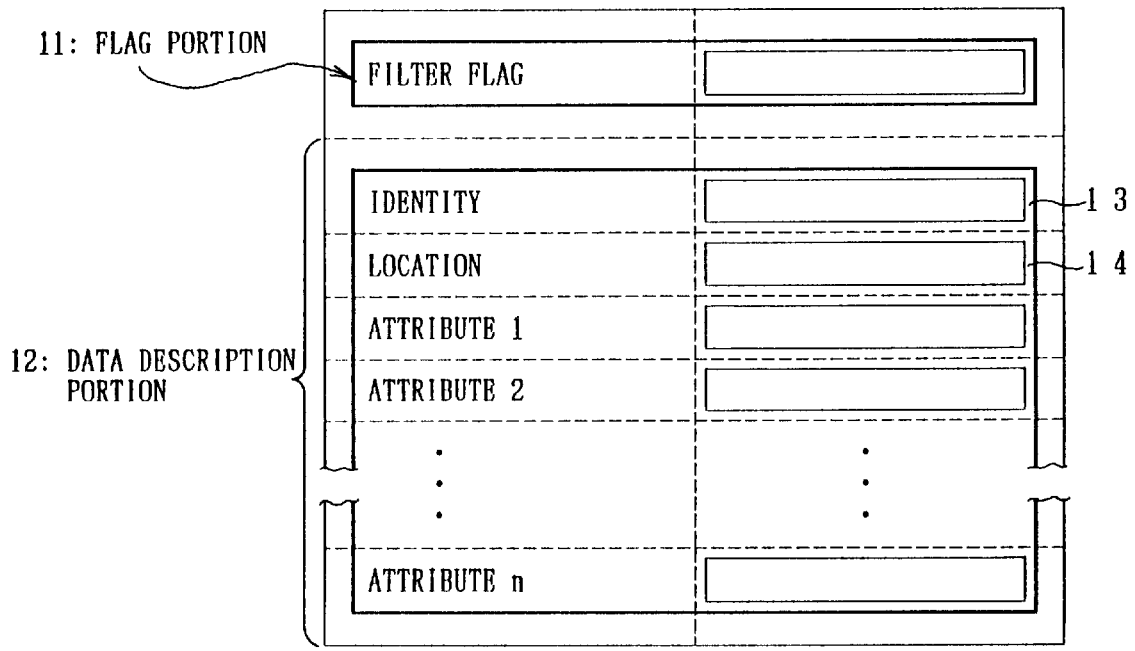
FIG. 2(a) is a view explaining example object data in general format which are stored in an object data section of an object managing unit of the above electronic pocketbook.
FIG. 2(b) is a view explaining an example content of an object information managing table in the above object managing unit.

Referring to FIGS. 1 through 19, the following description will describe an example embodiment of the present invention. Herein, an electronic pocketbook is explained in terms of structure and functions as a good example of an information managing device of the present invention. Also, the present electronic pocketbook herein is arranged to manage objects of four example kinds: "individual", "company", "document", and "meeting room". However, the present electronic pocketbook may be arranged to manage objects of the other kinds.

Generally, information of each object includes data of different attributes. To be more specific, information of individuals includes the name, address, zip code, telephone number, office, etc. of each person, while information of companies includes the company name, business address, zip code, telephone number, facsimile number, responsible person(s), etc. This is the reason why the databases are used to be constructed separately for the objects of each kind. However, the present electronic pocketbook is characterized in that it can manage the above four objects systematically through a single database.

To begin with, a schematic system structure of the above electronic pocketbook will be explained with reference to the block diagram of FIG. 1. As shown in the drawing, the electronic pocketbook includes an input unit 6 through which the user inputs various kinds of data or the like, and a display unit 7 on which the data, manipulation instructions for the user or the like are displayed. The input unit 6 includes a known pointing device or the like, and the display unit 7 may be composed of a liquid crystal display panel or the like. To be more specific, the electronic pocketbook may be arranged in a known manner, so that the user can input data or manipulation instructions by touching a tablet layered on the liquid crystal panel with a stylus, or input characters or figures written manually thereon with the stylus.

The above electronic pocketbook further includes an object managing unit 1 for managing data as to information of the objects of each kind (hereinafter, referred to as object data), and a filter managing unit 2 for managing the definition (hereinafter, referred to as filter) of the attributes of each of the above four objects: "individual", "company", "documents", and "meeting room".

The object managing unit 1 comprises an object data section 1a where the object data are stored as a whole, and an object information managing table 1b where information necessary to manage the respective object data are stored. Although it will be described below, the respective object data may be of different lengths depending on the kinds of their own objects. Thus, the respective object data are identified by pointers (hereinafter, referred to as head pointer) indicating the head addresses of their storage regions. In other words, the head pointers of all the object data stored in the object data section 1a are stored in the object information managing table 1b.

The filter managing unit 2 comprises a filter data section 2a where the filters are stored as filter data, and a filter information managing table 2b where information necessary to manage each filter is stored. Separate filters are made for the objects of each kind, and the filter data may be of different lengths depending on the kinds of their own objects, which will be described below. Thus, the filters are identified by their head pointers stored in the filter information managing table 2b. In short, the head pointers of all the filters stored in the filter data section 2a are stored in the filter information managing table 2b.

The present electronic pocketbook further includes an action managing unit 3 and a schedule managing unit 5 to enable the user to manage his schedule. The action managing unit 3 manages data (action data) describing the user's scheduled action(s), for example, business trips, meetings, etc. The schedule managing unit 5 manages the user's schedule by storing the action data and accompanying object data in relation with the time and date the user has inputted.

As shown in FIG. 1, the action managing unit 3 includes an action data section 3a where the action data are stored. No managing table like the object information managing table 1b or filter information managing table 2b is necessary because the action data are of a fixed length.

The schedule managing unit 5 comprises a schedule data section 5a where schedule data (which will be described below) are stored, and a schedule information managing table 5b where the head pointer or the like indicating the regions where the respective schedule data of different lengths are stored.

Further, the present electronic pocketbook includes a control unit 4 as a data managing control unit, by which the data input/output between the foregoing managing units are controlled systematically. The present electronic pocketbook further includes a temporary storage unit 8 where data are stored temporarily during the input/output and editing operations.

Next, the object data in both general format and specific format managed by the present electronic pocketbook will be explained in detail with reference to FIGS. 2 through 5.

FIG. 2(a) illustrates a data format according to which the object data are stored in the object managing unit 1, in other words, the drawing explains the object data in general format. As shown in the drawing, the object data in general format comprises a flag portion 11 and a data description portion 12. The flag portion 11 stores a filter flag (filter identifier) indicating the kind of its own filter that matches with the kind of specific object data. The detailed description of the filters will be given below. The data description portion 12 comprises a plurality of items including an identity segment 13, a location segment 14, and first through n'th (n: an arbitrary natural number) attribute segments.

Data as to names (for example, Tanaka and Yamamoto) of individuals, and data as to names of the companies (for example, XXX Co., Ltd) are written into the identity segment 13 when the object is the "individual" and "company", respectively. The address of each individual or company is written into the location segment 14. When the object is the "document", data as to a place where the concerned document is stored (for example, the title of the storage medium) are written into the location segment 14. Other data related to each object are written into the first through n'th attribute segments.

Note that each of the identity segment 13, location segment 14, and first through n'th attribute segments in the data description portion 12 has a fixed data length regardless of the kinds of the objects. However, a value of n may vary depending on the kinds of the objects. To be more specific, the value of n may be set to "5" and "8" when the objects are, for example, the "individual" and "company", respectively. In other words, although each item in the data description portion 12 of the object data has a fixed length, the length of the respective object data varies depending on their own kinds because the number of the items contained therein varies depending on the same.

Thus, to readily identify the respective object data stored in the object data section 1a, the object information managing table 1b holds the contents as shown in FIG. 2(b). More precisely, data ID (identification) Nos. are given to the respective object data stored in the object data section 1a, so that the object information managing table 1b stores the head addresses of the respective object data as the head pointers in relation with their data ID. Nos.

FIGS. 3(a) through 3(d) illustrate a data format specific to the object data of the four example kinds, respectively. In other words, the drawings conceptionally explain example specific formats of the object data of the four example kinds, respectively. The definition (filter) of each specific format is written and stored in the filter data section 2a of the filter managing unit 2 as filter data.

Separate filters are constructed for the objects of each kind to define the attribute of each item in the data description portion 12 of the respective object data. Since four kinds of objects, "individual", "company", "document", and "meeting room" are available in the present embodiment, four kinds of filters, "individual filter", "company filter", "document filter", and "meeting room filter", are constructed respectively for their own kinds of objects, and all the filters are stored in the filter data section 2a as the filter data.

For further understanding, the filter will be described more in detail.

FIG. 3(a) is a conceptional view explaining an example individual filter. As shown in the drawing, the "individual filter", which is used when the object is the "individual", defines items in the data description portion 12 of the "individual" object data as specific attributes, such as "name", "address", "zip code", "telephone number", and "office", respectively. To be more specific, the attributes "name" and "address" correspond to the identity segment 13 and location segment 14 of the "individual" object data, respectively, and the attributes "zip code", "telephone number", and "office" correspond to the first through third attribute segments of the "individual" object data, respectively.

On the other hand, the "company filter", which is used when the object is the "company", defines the items in the data description portion 12 of the "company" object data as specific attributes, such as "company name", "address", "zip code", "telephone number", and "responsible person" as shown in FIG. 3(b). To be more specific, the attribute, "company name" and "address" indicate the attributes of the data stored in the identity segment 13 and location segment 14 of the "company" object data, respectively, and the attributes "zip code", "telephone number" and "responsible person" correspond to the first through third attribute segments of the "company" object data, respectively.

As previously explained, the title of the attributes, such as "company name", "address", "zip code" "telephone number", and "responsible person", are stored in the filter data section 2a as the filter data. More precisely, all the filter data have their respective fields of a fixed length where the attribute titles are stored separately, while the number of the fields varies depending on the number of the attributes. This arrangement makes the respective filter data different in length.

As shown in FIG. 3(c), the "document filter", which is used when the object is the "document", defines the items in the data description portion 12 of the "document" object data as specific attributes, such as "document name", "storage location", "remarks", etc., respectively. To be more specific, the attributes "document name" and "storage location" indicate the attributes of the data stored in the identity segment 13 and location segment 14 of the "document" object data, respectively, and the attribute "remarks" corresponds to the first attribute segment of the "document" object data.

As shown in FIG. 3(d), the "meeting room filter", which is used when the object is the "meeting room", defines the items in the data description portion 12 of the "meeting room" object data as specific attributes, such as "room No.", "location", "extension", etc., respectively. To be more specific, the attributes "room No." and "location" indicate the attribute of data stored in the identity segment 13 (for example, Conference Room No. 1) and the location segment 14 (for example, 7th floor of the head office) of the "meeting room" object data, respectively, and the attribute "extension" corresponds to the first attribute segment of the "meeting room" object data.

As has been explained with reference to FIG. 2(a), the filter flag identifying the kind of its own filter is stored in the flag portion 11 of the respective object data. More precisely, in case of the "individual" object data, a flag identifying itself as the "individual filter" is stored in the flag portion 11. In this manner, the respective object data in general format are correlated with their corresponding filters, or the definitions of the respective object data in their own specific formats.

FIG. 4 is a view explaining an example content of the filter information managing table 2b in the filter managing unit 2. As shown in the drawing, each filter stored in the filter data section 2a as the filter data is given a specific filter ID No. Note that, as previously mentioned, the object data of each kind have a specific data length, which is stored in the filter information managing table 2b as shown in the drawing.

Also, since the respective filter data are of different lengths as previously mentioned, the head addresses, at which the respective filter data are stored in the filter data section 2a, are written into the filter information managing table 2b as the filter head pointers.

The filter information managing table 2b reveals that, for example, a filter given with the filter ID No.1 is the "individual filter" that defines the specific format of the "individual" object data; the "individual" object data corresponding to the above "individual filter" are 1,000-byte long; and the "individual filter" is stored in a region at an address 8,000 and beyond in the filter data section 2a.

When a filter is retrieved from the filter data section 2a, the filter ID No. is checked based on the filter flag of the object data, and based on which the head pointer and data length of the filter are found in the filter information managing table 2b. Consequently, the desired filter is retrieved by retrieving the data in the same length as the above-found length from the above-found head pointer.

As has been explained, the respective object data used in the present electronic pocketbook have the data lengths that vary depending on their own kinds. Thus, the respective object data are identified by their head pointers as the data of a variable length, and the data length of the respective object data is defined in the filter information managing table 2b. If more than one kind of objects having different attributes is managed by a single database by the conventional information managing device, the longest data length is adopted, thereby making a redundant data structure. As a result, a memory or the like for storing the data is not utilized to its full capacity. In contrast, since the respective object data are managed as the data having an appropriate data length for their own kinds in the present electronic pocketbook, the object data section 1a can be utilized effectively to its full capacity.

Next, how the object data in general format are converted into those in specific format will be explained using the "individual filter" as an example with reference to FIGS. 5(a) through 5(c). Assume that the object data in general format as shown in FIG. 5(a) are stored in the object data section 1a. Then, given the attribute defined by the "individual filter" as shown in FIG. 5(b), the items in the data description portion 12 of the object data are respectively converted as shown in FIG. 5(c), and displayed on the display unit 7 in the specific format of the their own kind (herein, the "individual"). Thus, giving the definition of the attribute of the object data of a specific kind through the corresponding filter makes it possible to display the object data in specific format, in which the data are displayed in a more easy-to-see arrangement.

Figure 6:
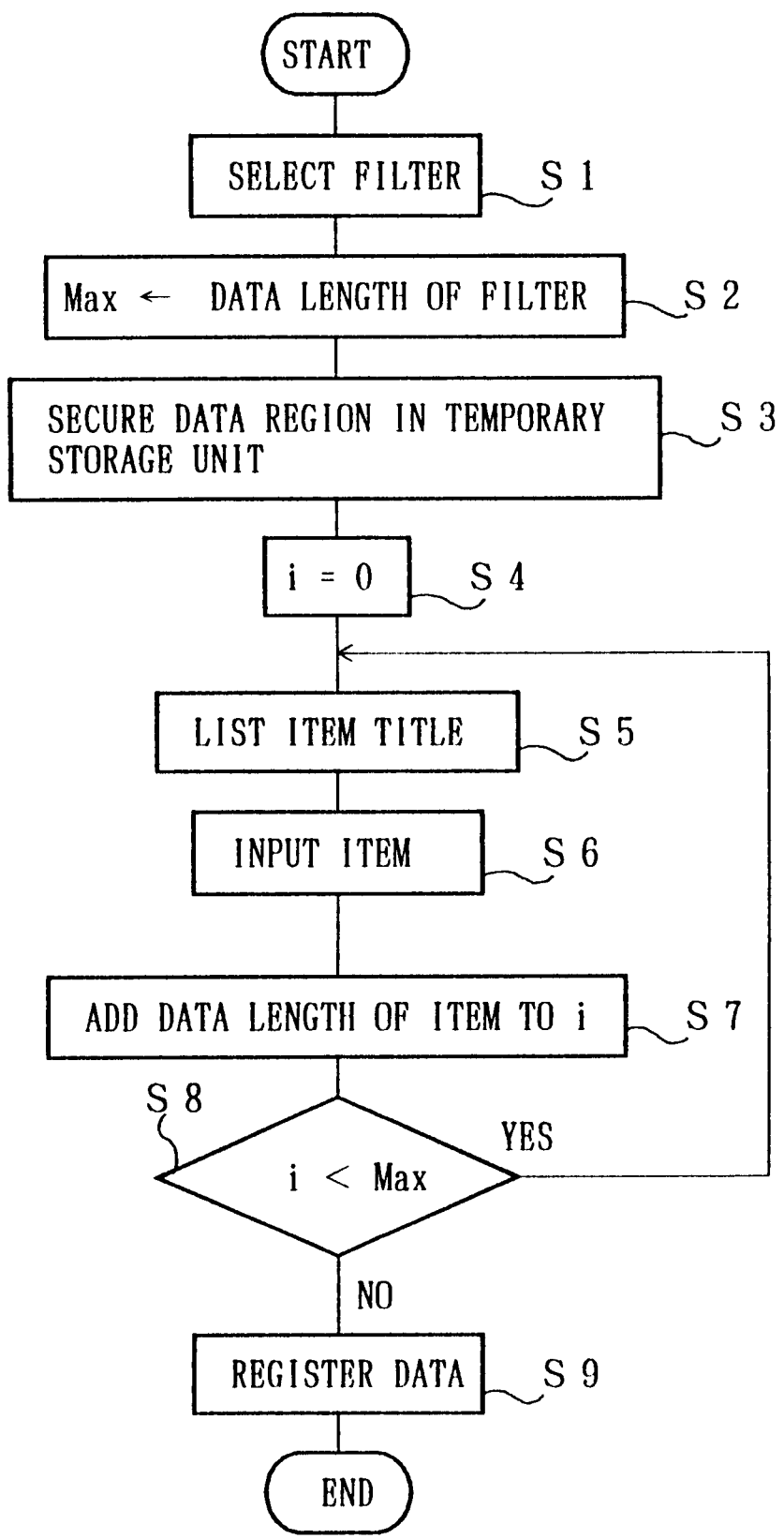
FIG. 6 is a flowchart detailing the procedure of registering new object data in the above electronic pocketbook.

Next, a procedure of registering new object data in the present electronic pocketbook will be explained with reference to FIG. 6.

For example, when the user wishes to manage the data (name, address, telephone numbers, etc.) of an individual in his address book, the user manages the above data as the object data using the "individual filter". Herein, assume that the user wishes to register data of an individual whose data have not been registered in the address book yet.

When the user selects the "individual" as the kind of the object in which the data should be registered using the input unit 6, the control unit 4 selects the "individual filter" stored in the filter data 2a in the filter managing unit 2 (Step 1, hereinafter Step 2 and steps beyond are abbreviated to S2, S3, . . . , respectively). In other words, since the kind identified by the filter is the kind of one specific object, the "individual filter" is selected when managing the data of an individual.

Then, the control unit 4 retrieves the data length of the "individual filter" from the filter information managing table 2b, which is hereinafter referred to as a constant Max (S2). Subsequently, the control unit 4 secures a new data region in the temporary storage unit 8 based on the constant Max (S3).

Then, the control unit 4 sets a variable i to an initial value "0" (S4), and sends the item title defined in the "individual filter" to the display unit 7 (S5). After the user has inputted the data of one item, the control unit 4 stores the input data into the temporary storage unit 8 (S6). Then, the control unit 4 adds the data length of the input data of the above item to the variable i (S7), and compares the latest variable i with the constant Max (S8). When the former is smaller than the latter in S8, the control unit 4 returns to S5 and sends a following item title to the display unit 7, and directs the user to input the data of the following item in the same manner as above. After the user has inputted the data of the following item, the control unit 4 stores the input data in the temporary storage section 8 next to those stored in the preceding operation.

The control unit 4 repeats S5 through S7 until the variable i reaches the constant Max in S8, or when the user completes the data input of all the items. Then, the control unit 4 retrieves the entire data constructed in the temporary storage unit 8 and stores the same in the object data section 1a in the object managing unit 1 as the object data, while at the same time, the control unit 4 registers the data ID No. (serial number) of the object data in the object information managing table 1b in relation with the pointer indicating the head address of the same (S9). This is the procedure adopted herein to register the object data.

Figure 7:
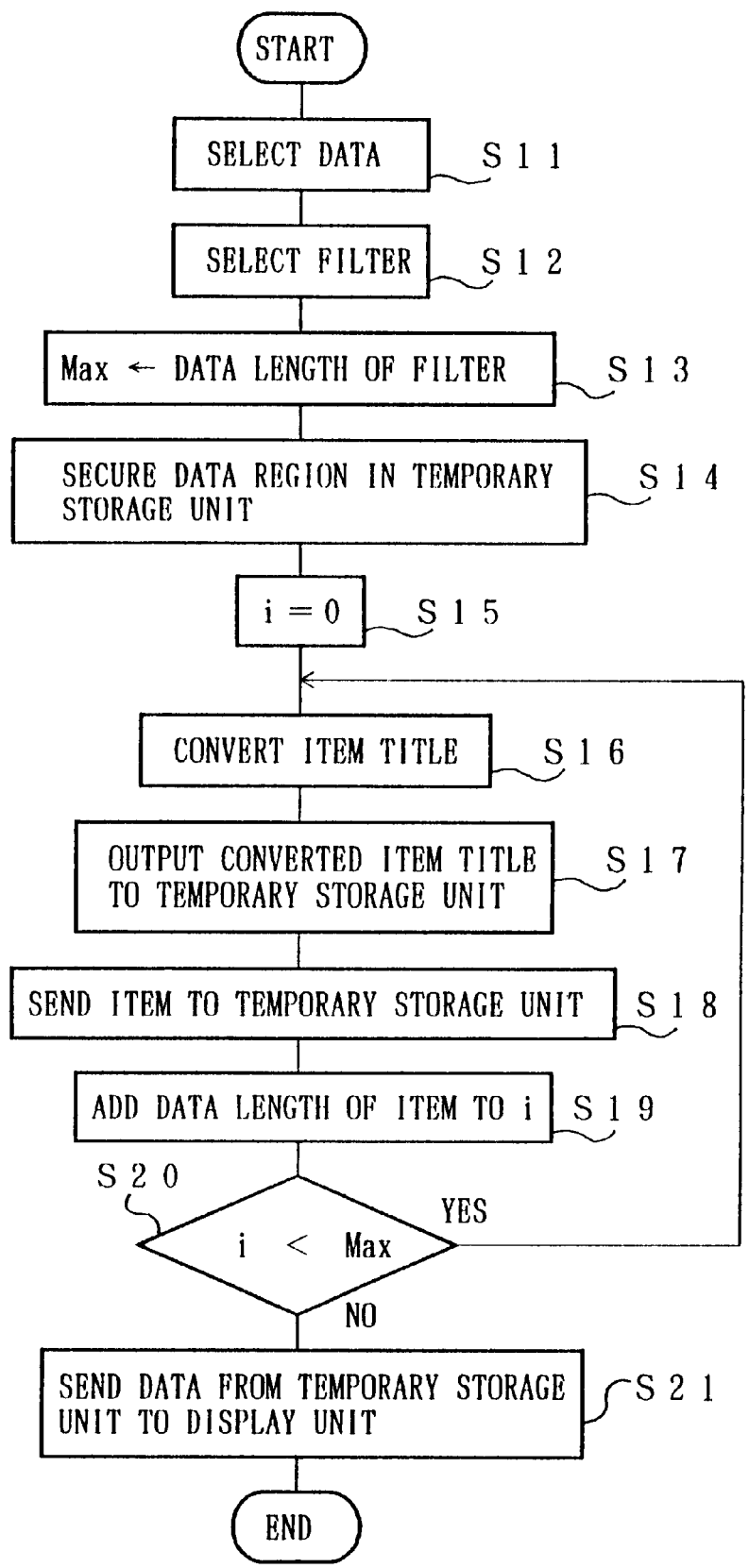
FIG. 7 is a flowchart detailing the procedure of retrieving the registered object data with the above electronic pocketbook.

Next, a procedure for retrieving the registered object data will be explained with reference to FIGS. 5(a) through 5(c) and the flowchart of FIG. 7.

To begin with, the control unit 4 directs the user to select the object data he wishes to retrieve from the object managing unit 1 (S11). For example, the content of each identity segment 13 of the respective object data stored in the object managing unit 1 may be displayed on the display unit 7, so that the user can readily select the one he wishes to retrieve using the input unit 6. Assume that the user has selected the object data as shown in FIG. 5(a) herein.

Once the object data are selected, the control unit 4 refers to the flag portion 11 of the selected object data, and based on which the control unit 4 selects the matching filter from the filter managing unit 2 (S12). In other words, since the "individual" is written in the flag portion 11 as shown in FIG. 5(a), the "individual filter" as shown in FIG. 5(b) is selected.

Next, the control unit 4 checks the data length of the filter selected form the filter information managing table 2b, which is referred to as a constant Max (S13). Further, the control unit 4 secures a new data region, or working region, in the temporary storage unit 8 based on the constant Max (S14), and sets a variable i to the initial value of "0" (S15).

Subsequently, the control unit 4 obtains one item title in the selected object data and converts the same into the first item title defined in the filter (S16). That is to say, the control unit 4 obtains the item title "identity" in the object data of FIG. 5(a), and converts the same into the item title "name" in the filter of FIG. 5(b). Then, the control unit 4 stores the converted item title in the temporary storage unit 8 (S17).

Subsequently, the control unit 4 extracts data corresponding to the item title obtained in S16 from the selected object data, and stores the same in the temporary storage unit 8 in relation with the above converted item title which has been stored therein one step ahead (S18). That is to say, as shown in FIG. 5(c), a name, "Taro Yamada" is stored in the temporary storage unit 8 in relation with the converted item title, "name".

Subsequently, the data length stored in S18 is added to the variable i (S19), and the latest variable i and the constant Max are compared (S20). When the former is smaller than the latter, the control unit 4 returns to S16, and converts the following item title into an item title defined in the filter.

The control unit 4 repeats S16 through S19 until the variable i reaches the constant Max, and when the variable i reaches the constant Max, in other words, when the object data subject to retrieval has been constructed completely in the temporary storage unit 8, the control unit 4 retrieves the entire data from the temporary storage unit 8 to display the same on the display unit 7 (S21). This is the procedure adopted herein to retrieve the object data.

In addition, the user can register a new filter into the present electronic pocketbook. To do so, the control unit 4 constructs filter data of a new filter in the filter data section 2a at instructions of the user, and subsequently directs the user to sequentially input item titles the new filter should contain through the input unit 6. After the item titles are inputted, the control unit 4 directs the user to input the filter title, after which the control unit 4 writes the filter title and the necessary data the user has inputted, such as the data length, head pointer, etc. of the new filter data into the filter information managing table 2b, and adds a value "1" to the latest filter ID No. The control unit 4 registers the latest filter ID No. thus obtained as the filter ID No. of the new filter.

Conventionally, separate databases are constructed to manage the objects of different kinds. Thus, when the user wishes to mail out invitations to both the individuals and companies, the data must be retrieved from two databases: the individual address database and company address database, which means the user has to retrieve the data redundantly at his expense of time and effort. In contrast, since the present electronic pocketbook manages the object data of all kinds in the object data managing unit 1 systemically, inputting a search condition, {"individual filter" flag or "company filter" flag}, enables the user to retrieve the data related to both the individuals and companies in one operation.

Also, the present electronic pocketbook can copy the object data of one kind as those of another kind, which will be explained below with reference to FIGS. 8(a) through 8(c) and the flowchart in FIG. 9. Assume that the object data related to an individual as shown in FIG. 8(a) will be copied, and the copied object data are registered as the "company" object data.

To begin with, the user inputs an instruction through the input unit 6 to select the object data of an individual, "Ichiro Yamada", as original data to be copied. Then, the control unit 4 selects the above specified object data from the object data section 1a (S31) and copies the same in the temporary storage unit 8 (S32). To carry out this procedure, the control unit 4 refers to the object information managing table 1b to check the head pointer of the original data and the head pointer of the following object data, and copies all the contents stored in the region that starts from the head pointer of the original data and ends right before the head pointer of the following object data into the temporary storage unit 8.

Then, the control unit 4 selects the filter ("company filter", herein) used for the copied object data in the temporary storage unit 8 at instruction from the user (S33). Subsequently, the control unit 4 converts the item title of the copied object data in the temporary storage unit 8 into the one defined in the filter ("company filter"), while at the same time, the control unit 4 controls the display unit 7 to display the copied object data together with the converted item title (S34). Consequently, the "individual filter" flag is converted into the "company filter" flag, and "name" and "department" are converted into "company name" and "responsible person", respectively.

The user checks the display of FIG. 8(b), and edits the data if necessary (S35). When the user edits the data through the input unit 6, the control unit 4 stores the amended data in the temporary storage unit 8. To be more specific, a name of an individual, "Ichiro Yamada" is currently displayed where the company name should have been displayed, and a company name, "Tanaka Co., Ltd." is currently displayed where the name of the responsible person should have been displayed. Thus, the user replaces the data from one column to another to create company data as shown in FIG. 8(c). After the user completes the editing, the control unit 4 registers the object data constructed in the temporary storage unit 8 in the object managing unit 1 (S36).

The present electronic pocketbook copies the object data of one kind as those of another kind in the above manner. What makes this possible is the arrangement that each item of the data description portion 12 is made to have the fixed data length in the object data of any kind, and that the attribute of the object data of each kind, namely, the item title, is defined by the filter, and therefore, can be converted readily by changing the filters in the temporary storage unit 8.

Next, the schedule managing function of the present electronic pocketbook will be explained. As previously mentioned, the present electronic pocketbook includes the action managing unit 3 and schedule managing unit 5 to carry out the schedule managing operation under the control of the control unit 4.

Example action data managed by the action managing unit 3 are illustrated in FIGS. 10(a) through 10(c). In the first place, the detailed description of the action data will be given. The action data have a fixed length and include only two items: "data ID No." and "action". No managing table is necessary because the action data are of a fixed length. In the "data ID No." item, serial numbers identifying the respective action data are stored, while data as to the action details, such as "planning", "business trip to Tokyo Branch", and "liaison conference" as shown respectively in FIGS. 10(a) through 10(c), are stored in the "action" item.

The action data are retrieved from the action data section 3a based on the data ID Nos. Assume that the data ID Nos. begin from 1 in ascending order, then the head pointer of the action data to be retrieved are computed as:

(data ID No. −1)×(length of action data).

Therefore, the concerned action data are retrieved by reading out the data from the action data section 3a in the same length as the action data from the address identified by the head pointer thus computed.

The user can also register new action data. To do so, the user inputs an instruction through the input unit 6 to register new action data, after which the control unit 4 obtains the last data ID No. registered in the action data section 3a and secures a region of a specific length for the new action data. At the same time, the control unit 4 increases the data ID No. by one and withholds the resulting number for the new action data.

Subsequently, the user inputs the data as to the action detail through the input unit 6. Then, the control unit 4 creates new action data by combining the input action detail and the latest data ID No. prepared in the above manner, and stores the resulting action data in the region secured in the action data unit 3a.

Next, the scheduled data will be described. The schedule data contain the start time and end time of a specific action together with the action data and object data accompanying with this specific action. FIG. 11(a) illustrates example schedule data stored in the schedule data section 5a. As shown in the drawing, the respective schedule data include link data having integers representing the start time and end time of a specific action, and the data ID No. (action data identifier) of the action data of the action and the data ID No. (object data identifier) of the object data accompanying with the action.

Since the link data in respective schedule data and action data establish one-to-one correspondence, the data ID Nos. of the respective action data are written at the head of their own link data as shown in FIG. 11(a), while the data ID Nos. of the respective object data are written in the second place and below in their own link data. However, the data ID Nos. of the object data are not essential, and there may be a case where the link data include a plurality of the data ID Nos.

Since the number of the data ID Nos. of the object data written into the link data varies as mentioned above, the schedule data have no variable length. This is the reason why the respective schedule data are given their own data ID Nos., and the head pointer of each is stored in the schedule information managing table 5*b* as shown in FIG. 11(*b*).

Next, a method of specifying the start time and end time of an action will be explained. The present electronic pocketbook can manage an action extending into the next day or beyond. To be more specific, the conventional information managing device has a drawback that, although it can manage a schedule per day or per month, it can not manage an action extending into the next day or beyond, such as an action starting at 15:00 pm of one specific day and ending 10:00 am of the next day. To enable the user to input the start time and end time of each action in the present electronic pocketbook, the present electronic pocketbook displays a schedule input time axis 21 as shown in FIG. 12 on the display unit 7. In short, in the present electronic pocketbook, the schedule input time axis 21 and a pointing device form time specifying means.

Figures 11, 12:
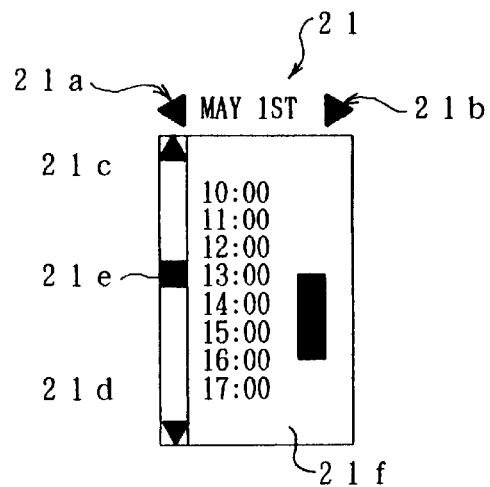
FIG. 12 is a view explaining a schedule input time axis displayed on the display unit when the user inputs a scheduled time.

The schedule input time axis 21 of FIG. 12 shows a time period between 10:00 and 17:00 of May 1st. The user can advance or set back the time period displayed on a display section 21*f* by pushing triangular buttons 21*a* through 21*d* or sliding a slide bar 21*e* vertically with the pointing device or the like. The buttons 21*c* or 21*d* is used to advance or set back the time period per hour, while the slide bar 21*e* is used to do so while skipping several hours. The date can be advanced or set back as well by pushing the button 21*a* or 21*b*, respectively. For example, pushing the button 21*a* can backdate the date per day, while pushing the button 21*b* can advance the date per day.

When the user wishes to specify the start time and end time, he displays a desired date on the time display unit 21*f* first, and thence a desired time zone, so that he can select desired times using the pointing device or the like. Seconds from a reference time (for example, 0:00:0 of Jan. 1st, 1980) to the times specified as the start time and end time by the user are computed and managed by the control unit 4 as integer values, respectively.

Figure 13:
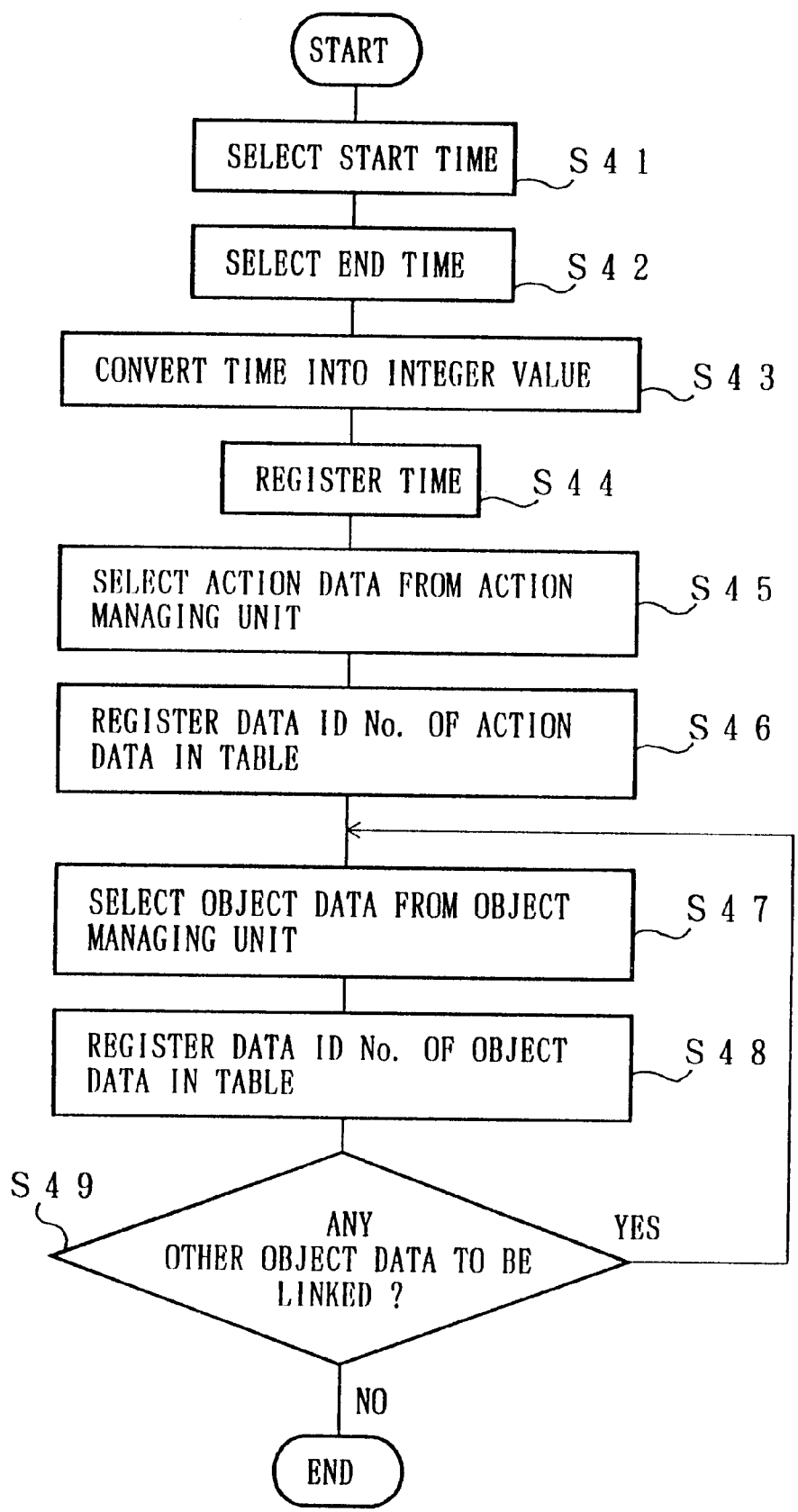
FIG. 13 is a flowchart detailing the procedure of registering schedule data in the above electronic pocketbook.

Next, the procedure of registering new schedule data will be explained with reference to the flowchart of FIG. 13 using a scheduled item of FIG. 14 as an example.

To begin with, the user selects the start time (for example, 13:00, May 1st) of the action using the schedule input time axis 21 through the input unit 6 (S41), and the end time (for example, 15:00, May 1st) in the same manner (S42). Accordingly, the control unit 4 controls the display unit 7 to display the selected time zone in the right side of the schedule input time axis 21 displayed on the time display section 21*f*, so that the user can confirm his selection.

Further, the control unit 4 computes an interval between the reference time (for example, 0:00:0, Jan. 1st, 1980) to the selected times in seconds, in other words, converts the start time and end time into integer values, respectively (S43), and registers the resulting values in the schedule data section 5*a* (S44).

Next, the control unit 4 directs the user to select the action data into which the details (herein, sales promotion meeting) of the desired action have been written (S45). In other words, the control unit 4 controls the display unit 7 to display a list of the action details which have been written into the action data stored in the action data section 2*a*, so that the user can readily select the desired action detail from the list. In case that the "sales promotion meeting" is not on the list, the user registers the same as new action data in the manner described above, and selects the same. The control unit 4 obtains the data ID No. of the action data selected by the user, and writes the same at the head of the link data of the schedule data in the schedule data section 5*a* (S46).

Subsequently, the user selects the object data he wishes to link to the "sales promotion meeting" from the object managing unit 1 (S47). Here again, the control unit 4 controls the display unit 7 to display a list of the object data stored in the object managing unit 1. Assume that the object data of one of the participants, Mr. Yamamoto, are selected from the "individual" object data. In case that desired object data are not stored in the object managing unit 1, the user registers such desired object data as new object data in the object managing unit 1 in the manner described above, and selects the same. Once the user has selected the object data, the control unit 4 obtains the data ID No. of the same and writes that particular data ID No. in the link data of the schedule data stored in the schedule data section 5*a* next to the data ID No. of the above action data (S48). If the user wishes to link any other object data, the control unit 4 returns to S47 (S49).

Figure 14:
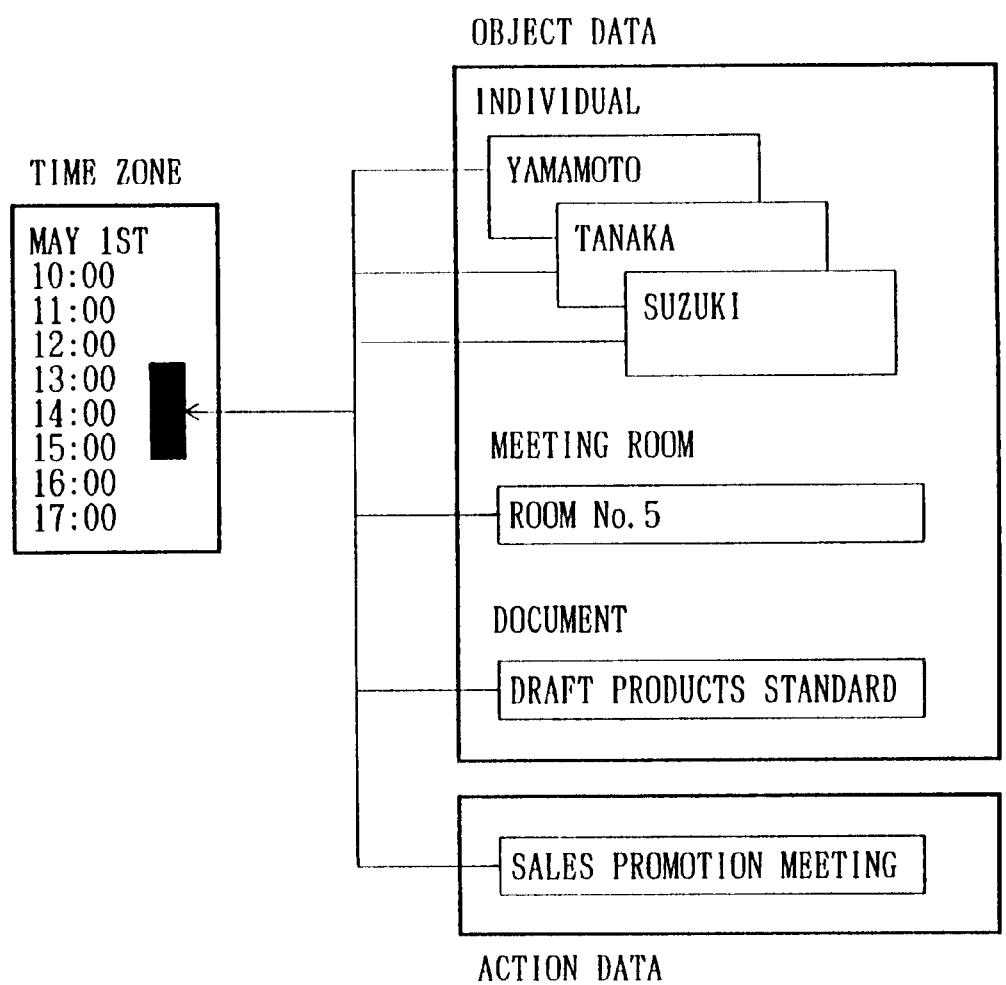
FIG. 14 is a view explaining an example content of a scheduled item the user wishes to register.

The control unit 4 repeats S47 and S48 as many times as the user wishes, and as shown in FIG. 14, the "individual" object data of the other participants, Mr. Tanaka and Mr. Suzuki, the "meeting room" object data, the "document" object data, etc. are added sequentially to the link data of the schedule data. This is the procedure adopted herein to register schedule data.

Next, the procedure of retrieving the registered schedule data will be explained with reference to the flowchart of FIG. 15 and FIG. 16.

Once the user has inputted an instruction to retrieve the schedule data through the input unit 6, the control unit 4 starts the operation described below. Since the user must select the schedule data he wishes to retrieve at this point, the control unit 4 searches all the schedule data currently registered in the schedule data section 5*a*, and controls the display unit 7 to display the action details written into the action data related to the above schedule data or the time zone in which the above schedule data has been registered, so that the user can readily select the schedule data he wishes to retrieve.

Then, the control unit 4 selects the schedule data selected by the user from the schedule data section 5*a* (S51). Further, the control unit 4 secures a working region in the temporary storage unit 8 based on the content of the link data of the selected schedule data (S52).

The control unit 4 obtains the start time and end time which have been written into the selected schedule data in the form of integer values, and converts the same into the times and date in a easy-to-see arrangement in a manner reverse to the time-integer value conversion (S53). Then, the control unit 4 stores the times and date thus converted into the region secured in S52 (S54).

Subsequently, the control unit 4 obtains the data ID No. written at the head of the link data of the above schedule data (S55). As has been explained above, the data ID No. obtained at this point is the data ID No. of the action data. Thus, the control unit 4 obtains the action data having the same ID No. from the action managing unit 3 (S56). Since an action, "sales promotion meeting", is written into the action data having the same ID No. herein, the control unit 4 obtains "sales promotion meeting" as the action detail and stores the same in the region secured in the temporary storage unit 8 (S57).

Subsequently, the control unit 4 checks whether any other data ID No. has been written into the link data of the above schedule data or not (S58). When any other data ID No. has been written, the control unit 4 obtains this particular data ID No. (S59). Since the data ID Nos. written into the link data of the schedule data in the second place and below are the data ID Nos. of the object data, the control unit 4 retrieves the object data having the same data ID No(s). from the object managing unit 1 (S60).

Then, the control unit 4 obtains the filter name from the flag portion 11 of the retrieved object data (S61). For example, if "individual" is written into the flag portion 11 of the object data having the corresponding data ID No., the control unit 4 stores this particular filter name ("individual" herein) into the region secured in the temporary storage unit 8 (S62). This particular filter name is displayed on the display unit 7 as one of the item titles of the scheduled item. Then, the control unit 4 obtains the data (for example, Yamamoto) written into the identity segment 13 of the retrieved object data, and stores the same into the region secured in the temporary storage unit 8 (S58) and returns to S58.

The control unit 4 carries out S58 through S63 for all the data having the data ID Nos. written in the link data of the schedule data separately, and after completing the above process, the control unit 4 controls the display unit 7 to display the entire content stored in the temporary storage unit 8 (S64). An example of the display is illustrated in FIG. 16. In other words, it has become possible to display the content of the schedule data in an easy-to-see arrangement by displaying the filter name, or the kinds of the object ("meeting room", "individual", and "document") based on the data ID Nos. of the particular object data written in the link data with reference to all the object data stored in the object managing unit 1, together with the data ("Room No.5", "Yamamoto", "Tanaka", "Suzuki", and "draft products standard") stored in the identity segments 13 of the above respective object data.

Figure 17:
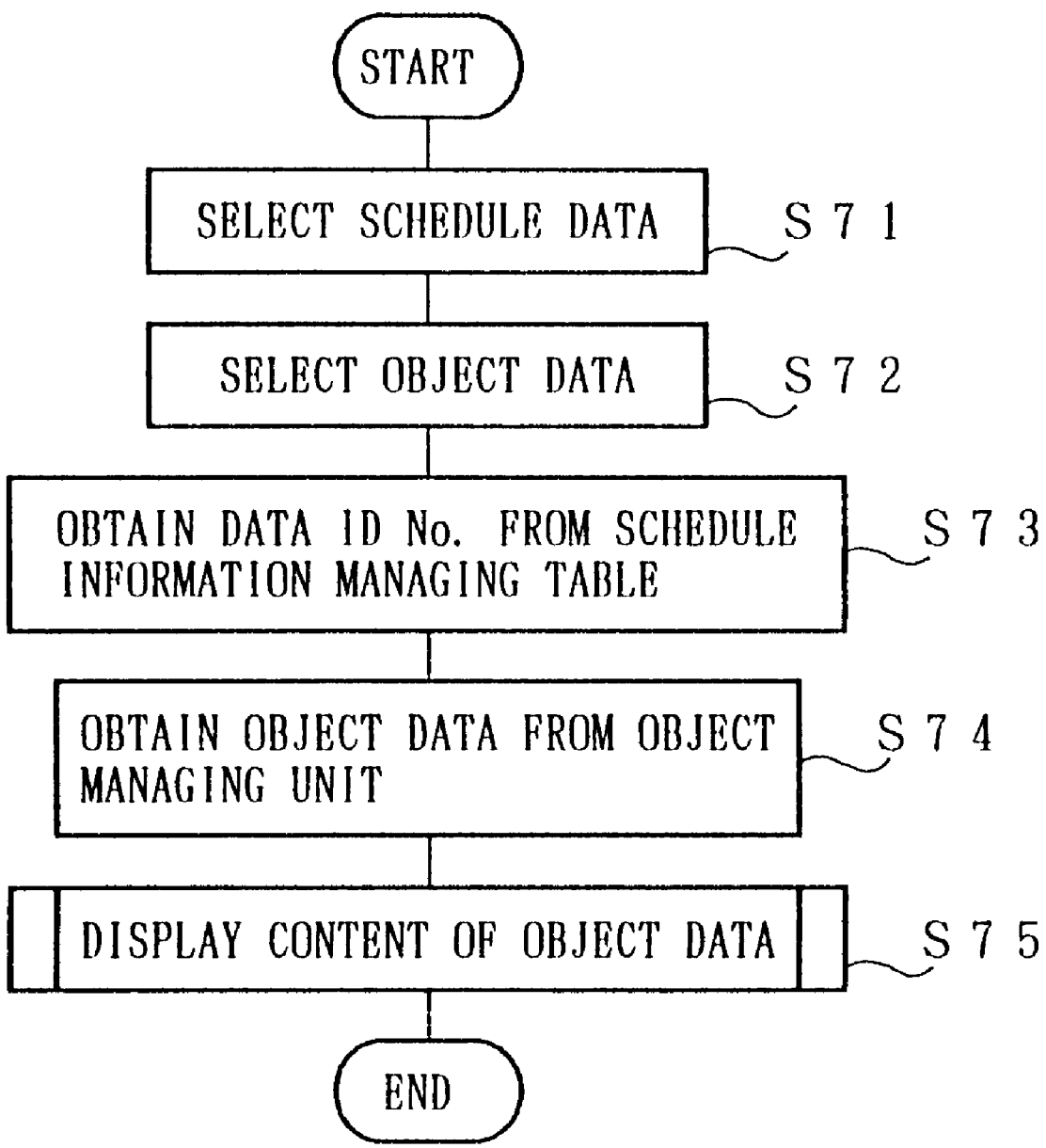
FIG. 17 is a flowchart detailing the procedure of retrieving more detailed object data accompanying with the above scheduled item.
Figure 18:
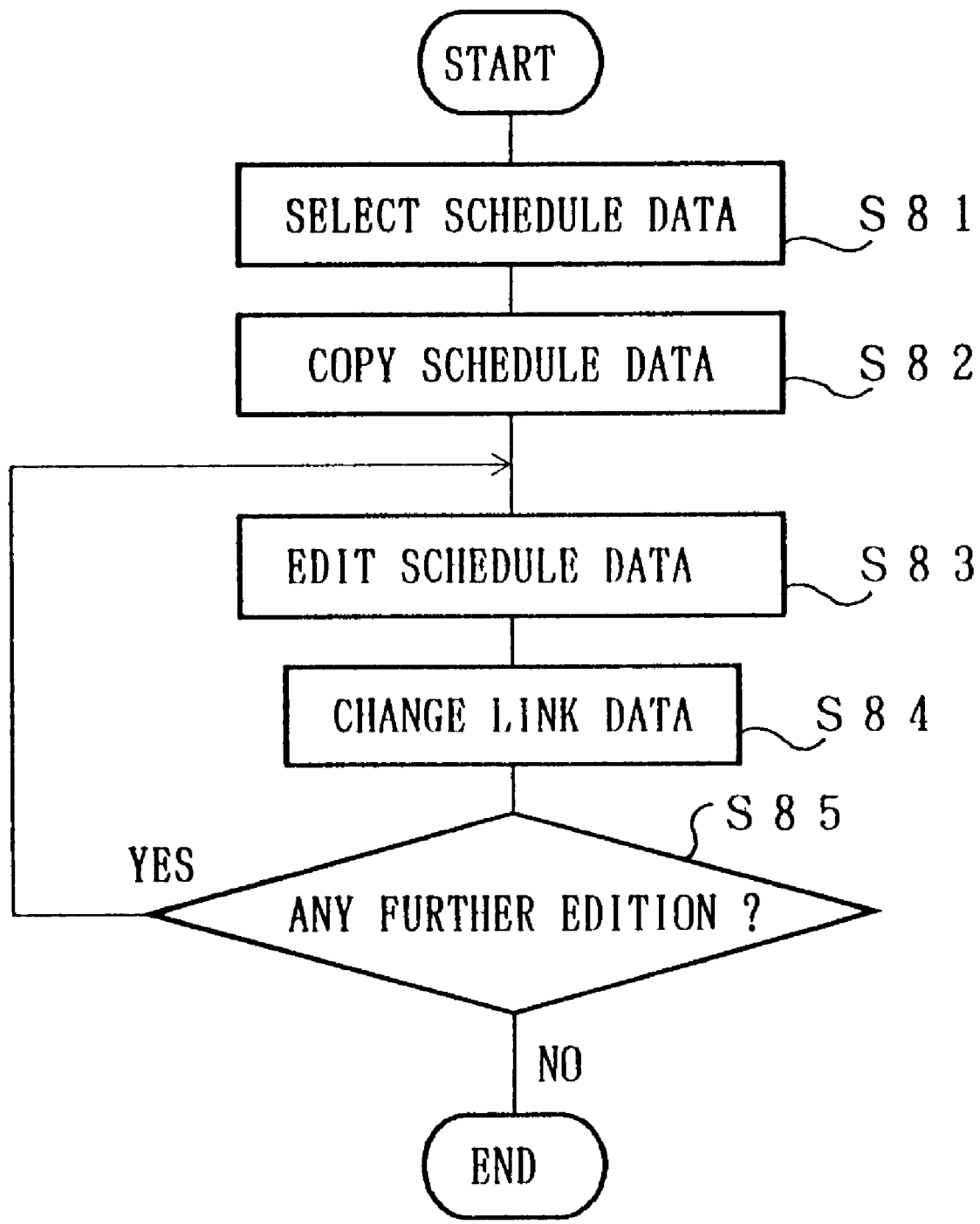
FIG. 18 is a flowchart detailing the procedure of creating new schedule data by copying registered schedule data.
Figure 19:
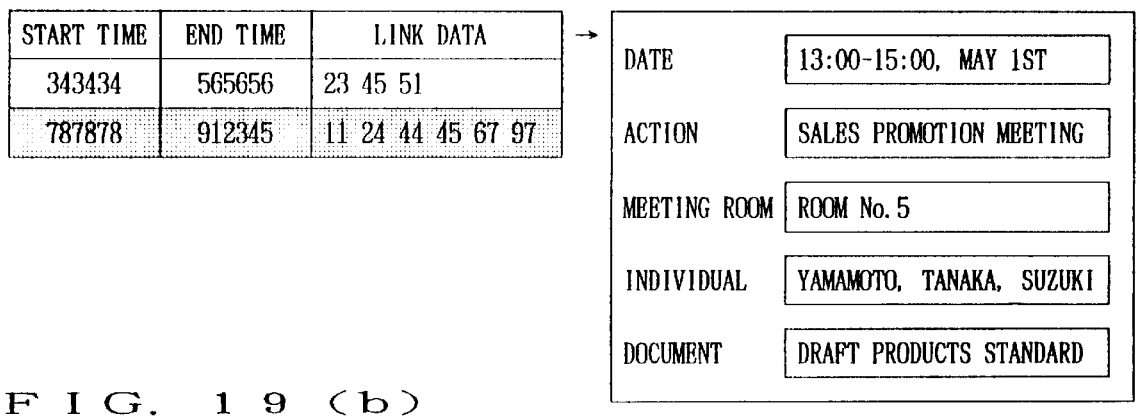
FIGS. 19(a) through 19(d) are views explaining the changes in the content of the schedule data section and display unit in accordance with the flowchart of FIG. 18.
Figure 19:
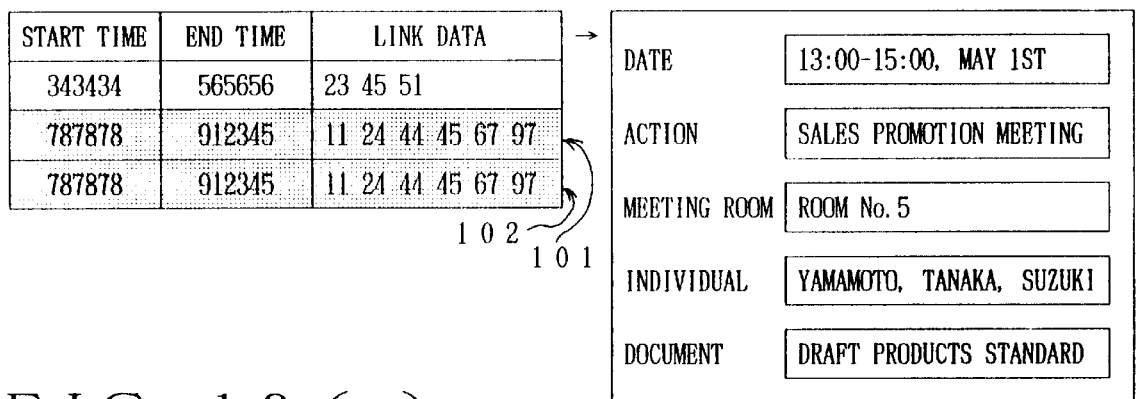
Figure 19:
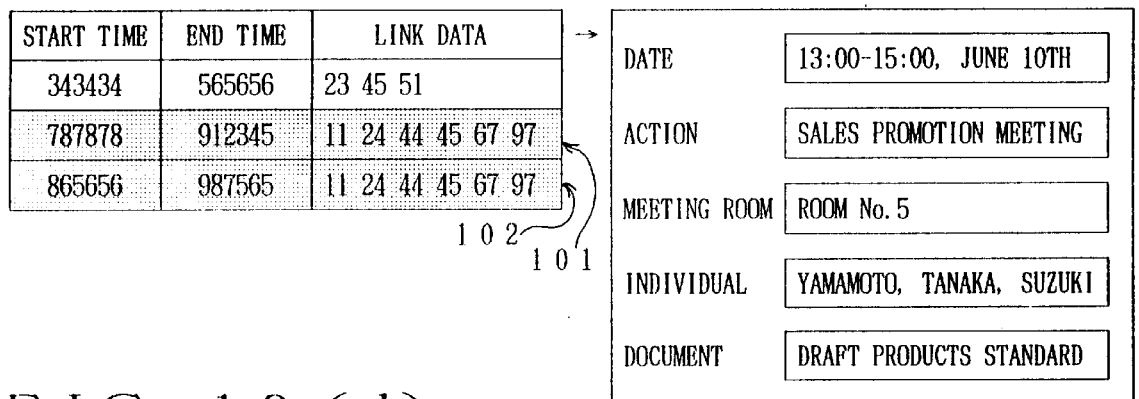
Figure 19:
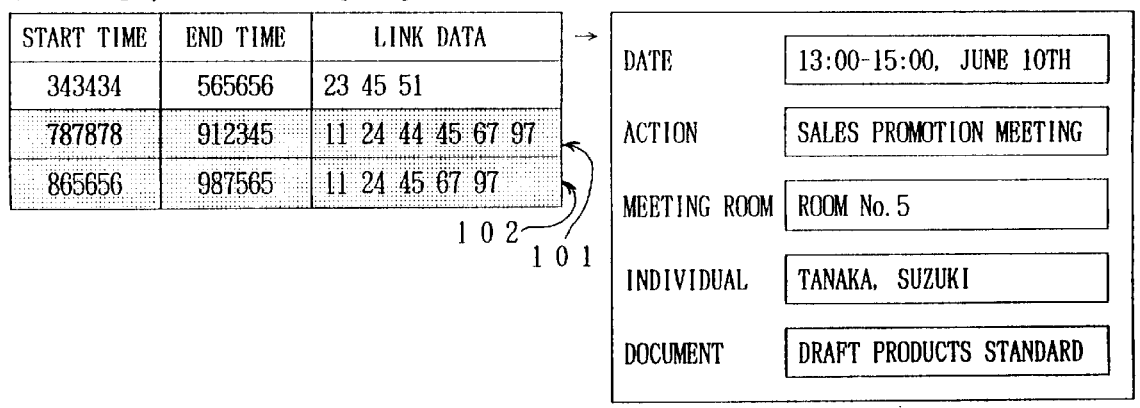

With the present electronic pocketbook, the user can see further details of the object data of each kind on the display screen of the schedule data as shown in FIG. 16, the procedure of which will be explained with reference to the flowchart of FIG. 17.

Figure 15:
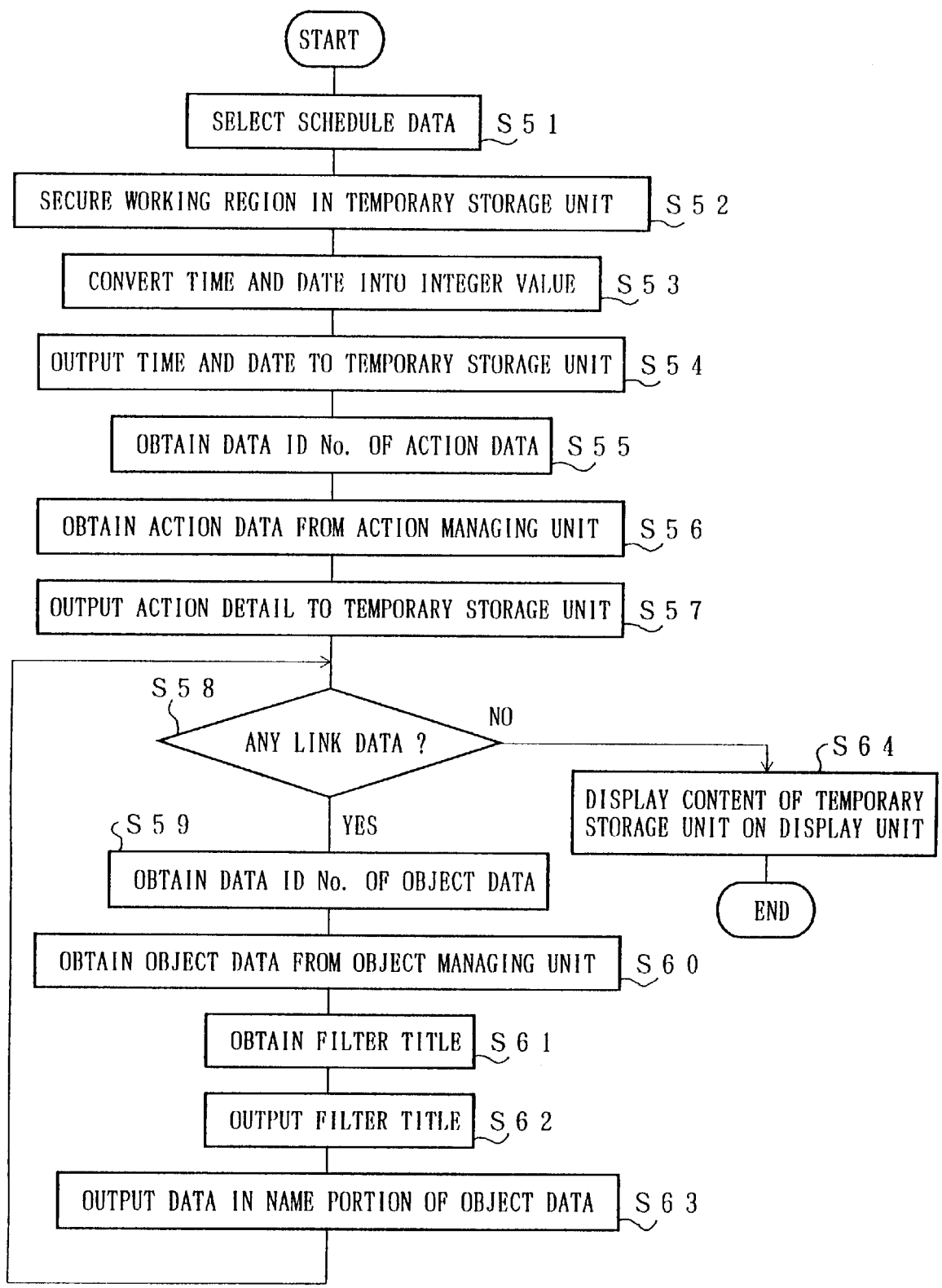
FIG. 15 is a flowchart detailing the procedure of retrieving and displaying schedule data on the display unit of the above electronic pocketbook.

When the user selects the schedule data he wishes to display on the display screen (S71), the display screen as shown in FIG. 16 is displayed in accordance with the procedure of the flowchart of FIG. 15 and the user selects a desired object (S72). For example, if the user wishes to check the phone number of Mr. Yamamoto displayed in the individual column on the display screen of FIG. 16, he selects a position where "Yamamoto" is displayed using the pointing device or the like.

The control unit 4 learns that the user has selected the object data related to Mr. Yamamoto through the input unit 6, and obtains the data ID No. of the object data from the schedule data stored in the schedule managing unit 5 (S73). The control unit 4 obtains the object data corresponding to the obtained ID No. from the object managing unit 1 (S74) and controls the display unit 7 to display the content of the object data in accordance with the procedure detailed with reference to the flowchart of FIG. 7 (S75).

As has been explained, the present electronic pocketbook manages the object data of more than one kind systematically using a single database, and as many object data as the user wishes are linked to the schedule data. To be more specific, when the user wishes to make a phone call to one of the participants of the sales promotion meeting, he used to check the names of the participants using the schedule managing function first, and thence switches to the address database to search the checked name. Whereas the user does not have to switch the databases with the present electronic pocketbook, that is to say, the user can obtain the details of the object of any kind only by selecting the desired object on the screen in the schedule managing function. Since the data ID No. and object data written into the link data of the schedule data have a one-to-one correspondence, if more than one Mr. Yamamoto is registered in the "individual" object data, the user does not have to check which Yamamoto is in question.

In addition, some kinds of meetings are held regularly, and the subject and participants are more or less the same every time, and the only difference would be the scheduled time. Since the present electronic pocketbook can copy and edit the registered schedule data and register the edited one as new schedule data, the user does not have to go through the entire process of registering new schedule data.

The procedure of copying and editing the schedule data will be explained with reference to the flowchart of FIG. 18 and FIGS. 19(a) through 19(d).

To begin with, the user selects original data, or schedule data he wishes to copy, through the input unit 6 (S81). Assume that the schedule data thus selected are stored in the schedule data section 5a as is illustrated in the left side of FIG. 19(a). Once the user has selected the schedule data, the control unit 4 obtains the schedule data from the schedule data section 5a, and controls the display unit 7 to display the same as is illustrated in the right side of FIG. 19(a).

Then, the control unit 4 copies the schedule data thus obtained and registers the same in the schedule data section 5a as new data (S82). The content of the schedule data section 5a at this point is illustrated in the left side of FIG. 19(b), where numeral 101 denote the original data and numeral 102 denote the copied schedule data. Also, the screen of the display unit 7 at this point shows a display as illustrated in the right side of FIG. 19(b).

Here, the user can edit the schedule data as he wishes (S83). Assume that the user wishes to change the start time and end time to 13:00 and 15:00 of June 10th, respectively. The user can input the desired times using the above-described schedule input time axis 21. As has been explained, the input start and end times are converted into integer values, respectively (herein, where "Yamamoto" is displayed on the display screen of the display unit 7 as is illustrated in the right side of FIG. 19(c) using the pointing device or the like and inputs an instruction to delete the same. The control unit learns that the instruction to delete the object of "Yamamoto" is inputted through the input unit 6, and accordingly, deletes the data ID No. of the corresponding object data from the link data of the schedule data 102. Consequently, the object data, namely, the individual data of "Yamamoto" (the data ID No. 44) are deleted on the screen.

As can be understood from the above explanation, the present electronic pocketbook can register new schedule data easily by copying the data in the schedule data section 5a and editing the same. Also, writing the data ID No. of the object data in the link data of the schedule data can correlate the object to each scheduled item. Thus, unlike the conventional information managing device arranged in such a manner that all the information must be registered for each scheduled item, the present electronic pocketbook does not have to store the same data redundantly, thereby making it possible to use the storage efficiently to its full capacity. Moreover, when the user wishes to amend the object data or the like related to the schedule data, he only has to amend the portion that needs the correction once. Consequently, the user can correct the data in a reliable manner while saving his time and effort.

The data ID Nos. in the form of serial integers are used as identifiers to identify the object data and action data herein. However, the object and action data can be identified any other adequate method. Also, the item titles defined in the general and specific forms of the object data are not limited to those used as examples in the above, and the user can use any item title he wishes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information managing device comprising:

an object managing unit storing object data of more than one kind in a common general format regardless of kinds of said object data;

a filter managing unit storing filters that define a specific format for the objects of each kind, respectively;

a data management control unit converting the object data between the common general format stored in said object managing unit and the specific format for retrieval based on a respective one of the filters stored in the filter managing unit, wherein said object data are correlated with filter identifiers each of which respectively specifies its own corresponding one of said filters.

2. The information managing device as defined in claim 1 further comprising:

input means for inputting a time zone;

an action managing unit storing action data each of said action data having a unique action data identifier and containing information other than said time zone;

a schedule managing unit storing said input time zone in relation with at least one action data identifier which specifies the action data related to said input time zone, said schedule managing unit being provided separately from said object managing unit, wherein, when there exist any object data accompanying said input time zone, said schedule managing unit also stores an object data identifier which specifies said object data accompanying said input time zone.

3. The information managing unit as defined in claim 2, wherein said schedule managing unit includes:

a schedule data section storing schedule data; and a schedule information managing table storing a head address and a data length of said respective schedule data stored in said schedule data section, said respective schedule data including at least two fields of a fixed length, said input time zone being stored in one of said two fields, said action data identifier being stored in the other field, said object data identifier specifying said object data accompanying said input time zone being stored in another field of said schedule data.

4. The information managing device as defined in claim 2, wherein said input means includes:

time axis display means for displaying at least a part of a time axis extending more than one day; and time specifying means for specifying a time on said time axis, whereby a time interval between two times specified by said time specifying means is inputted as said time zone.

5. The information managing device as defined in claim 1, wherein said respective object data in the common general format includes at least one field of a fixed length, and wherein the number of fields corresponding to said respective object data varies depending on the kinds of the object data.

6. The information managing device as defined in claim 5, wherein said object managing unit includes:

an object data section storing the object data; and an object information managing table storing a head address and a data length of said respective object data stored in said object data section.

7. The information managing device as defined in claim 1, wherein said filter is stored in said filter managing unit as filter data, said filter data including a flag portion designating said filter identifier and a data description portion composed of at least one attribute field of a fixed length, said attribute field storing an attribute of a field included in the object data of a same kind.

8. The information managing device as defined in claim 1, wherein said filter managing unit includes:

a filter data section storing respective filter data; and a filter information managing table storing a head address and a data length of said respective filter data stored in said filter data section.

9. A method of copying object data using the information managing device as defined in claim 1, said method comprising the step of copying object data of a first kind to object data of a second kind in general format, said second kind being different from said first kind.

10. The method as defined in claim 9, wherein said object data in general format include a field of a fixed length.

11. A method of scheduling an action with an information managing device for managing object data of more than one kind including action data, comprising the steps of:

(a) displaying at least a time axis extending more than one day to input a time zone;

(b) inputting action data related to said time zone;

(c) storing data representing said time zone in relation with an action data identifier allocated uniquely to each of said input action data; and (d) when there exist any input object data accompanying with said time zone, correlating an object data identifier allocated uniquely to each of said object data with said time zone.

12. The method as defined in claim 11, wherein:

at least a part of the action data stored in said information managing device is displayed to select the action data related to said time zone before said step (b) is carried out; and at least a part of the object data, excluding the action data, stored in said information managing device is displayed to select the object data accompanying said time zone before said step (d) is carried out.

13. The method as defined in claim 11, wherein said respective object data include a title portion where a title of their own objects is stored, and said method further comprises:

(e) displaying the title stored in said title portion of the object data stored in relation with said time zone; and (f) when a desired title is selected from said displayed title, displaying a content of the object data having said selected title in their title portion.

* * * * *